US007184166B2

(12) United States Patent
Otsuki

(10) Patent No.: US 7,184,166 B2
(45) Date of Patent: Feb. 27, 2007

(54) PRINTING DEVICE, PRINTING METHOD AND/OR COMPUTER SYSTEM

(75) Inventor: Koichi Otsuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 822 days.

(21) Appl. No.: 10/219,827

(22) Filed: Aug. 16, 2002

(65) Prior Publication Data

US 2003/0063314 A1 Apr. 3, 2003

(30) Foreign Application Priority Data

Aug. 29, 2001 (JP) ............................ 2001-260112

(51) Int. Cl.
*G06K 15/00* (2006.01)
*G06F 3/12* (2006.01)

(52) U.S. Cl. .................................... 358/1.16; 358/1.14

(58) Field of Classification Search ............... 358/1.16, 358/1.18, 1.14, 1.15
See application file for complete search history.

(56) References Cited

U.S. PATENT DOCUMENTS

2001/0012117 A1* 8/2001 Nakano ..................... 358/1.14
2002/0075344 A1* 6/2002 Usui et al. .................... 347/19

FOREIGN PATENT DOCUMENTS

| | | |
|---|---|---|
| JP | 5-278307 | 10/1993 |
| JP | 10-24612 | 1/1998 |
| JP | 10-316261 | 12/1998 |
| JP | 2000-103087 | 4/2000 |
| JP | 2000-334974 | 12/2000 |
| JP | 2001-213032 | 8/2001 |
| JP | 2001-225970 | 8/2001 |

* cited by examiner

*Primary Examiner*—Douglas Q. Tran
(74) *Attorney, Agent, or Firm*—Sughrue Mion, PLLC

(57) ABSTRACT

A printing device body reads-in at least one of printing-medium-type information relating to a type of a printing medium provided in a printing-medium unit and stored in printing-medium storage unit, and ink-type information relating to a type of ink contained in an ink unit and stored in ink storage unit. The printing device body determines suitability between at least two of: a printing medium provided in the printing-medium unit, ink contained in the ink unit, and type information designated by a user.

10 Claims, 15 Drawing Sheets

336

| ADDRESS | CONTENTS OF INFORMATION (8-BIT INFORMATION) |
|---|---|
| 00H | PAPER REMAINING AMOUNT |
| 01H | PAPER REMAINING AMOUNT |
| 02H | START-OF-USE DATE |
| 03H | END-OF-USE DATE |
| 04H | PAPER TYPE |
| 05H | PAPER THICKNESS |
| 06H | PAPER COLOR |
| 07H | PAPER WIDTH |
| 08H | PAPER SURFACE QUALITY |
| 09H | MANUFACTURING DATE |

338 (00H–03H)

339 (04H–09H)

FIG. 3

80

| | CONTENTS OF INFORMATION | |
|---|---|---|
| 601 | CYAN-INK REMAINING-AMOUNT DATA | 660 |
| 602 | CYAN-INK REMAINING-AMOUNT DATA | |
| 603 | MAGENTA-INK REMAINING-AMOUNT DATA | |
| 604 | MAGENTA-INK REMAINING-AMOUNT DATA | |
| 605 | YELLOW-INK REMAINING-AMOUNT DATA | |
| 606 | YELLOW-INK REMAINING-AMOUNT DATA | |
| 607 | LIGHT-CYAN-INK REMAINING-AMOUNT DATA | |
| 608 | LIGHT-CYAN-INK REMAINING-AMOUNT DATA | |
| 609 | LIGHT-MAGENTA-INK REMAINING-AMOUNT DATA | |
| 610 | LIGHT-MAGENTA-INK REMAINING-AMOUNT DATA | |
| 611 | OPENING-TIME DATA (YEAR) | 650 |
| 612 | OPENING-TIME DATA (MONTH) | |
| 613 | VERSION DATA OF INK CARTRIDGE | |
| 614 | INK-TYPE DATA | |
| 615 | MANUFACTURING YEAR DATA | |
| 616 | MANUFACTURING MONTH DATA | |
| 617 | MANUFACTURING DAY DATA | |
| 618 | MANUFACTURING LINE DATA | |
| 619 | SERIAL-NUMBER DATA | |
| 620 | RECYCLE-HISTORY DATA | |

FIG. 11

| TYPE OF PAPER / TYPE OF INK | INK X | INK Y | INK Z |
|---|---|---|---|
| PAPER A | O | × | × |
| PAPER B | O | O | × |
| PAPER C | O | O | O |
| PAPER D | × | O | O |

O: PAPER AND INK SUIT EACH OTHER
×: PAPER AND INK DO NOT SUIT EACH OTHER

FIG. 13

PRINTING DEVICE, PRINTING METHOD AND/OR COMPUTER SYSTEM

BACKGROUND OF THE INVENTION

The present application claims priority upon Japanese Patent Application No. 2001-260112 filed on Aug. 29, 2001, which is herein incorporated by reference.

FIELD OF THE INVENTION

The present invention relates to a printing device, a printing method, and a computer system.

DESCRIPTION OF THE RELATED ART

There is a printing device such as an inkjet printer which is used in a computer system and which comprises: a printing device body; an ink unit which is attachable/detachable to/from the printing device body and contains ink to be supplied to the printing device body; and a printing-medium unit which is attachable/detachable to/from the printing device body and comprises a printing medium such as roll paper.

Further, as ink used in printing by the printing device, there are, classified roughly, dye ink and pigment ink; and as a printing medium to be printed on by the printing device, there are various kinds of paper such as plain paper, and glossy print. There is suitability between the various ink and the various printing media, and it is preferable to print using ink and a printing medium that are suitable to each other.

However, in the above-described printing device, since the ink unit and the printing-medium unit such as the roll-paper unit are respectively attachable/detachable to/from the printing device body, there is a case where ink and a printing medium which do not suit each other are set to the device body.

When printing is conducted in a state where the device body is provided with ink and a printing medium which are not suitable to each other, there is possibility that preferable printing may not be conducted. For example, when printing is conducted by using pigment ink on a printing medium which is not suitable to such pigment ink, there may arise a problem such as peeling of applied ink.

Further, in a case where the printing device comprises a printing-medium-designating-information input section to which input is information relating to the type of printing medium such as paper and the type of ink which is designated by a user through a user interface, in order to conduct high-quality printing, it is preferable for the printing device to determine whether or not the information input to this printing-medium-designating-information input section, and the type of the printing medium provided in the printing-medium unit or the type of ink contained in the ink unit match.

SUMMARY OF THE INVENTION

The present invention is made in consideration of the above problems, and its object is to realize a printing device, a printing method, and a computer system which may conduct high-quality printing by determining the suitability between a type of a printing medium, a type of ink, and the like.

The present invention is a printing device, a printing method, and a computer system characterized in that a printing device body reads-in at least one of printing-medium-type information relating to a type of a printing medium provided in a printing-medium unit and stored in printing-medium storage means, and ink-type information relating to a type of ink contained in an ink unit and stored in ink storage means; and suitability between at least two of: the printing medium provided in the printing-medium unit, the ink contained in the ink unit, and type information designated by a user is determined.

Other features of the present invention will become clear according to the description of the present specification and the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 3 is a diagram showing data arrangement in a memory cell 336 provided in the storage element 33;

FIG. 11 is an explanatory diagram showing data arrangement of a storage element incorporated in a color-ink cartridge INC1;

FIG. 13 is a diagram showing an example of information stored in a PROM 52.

DESCRIPTION OF THE PREFERRED EMBODIMENTS

Figure 1:
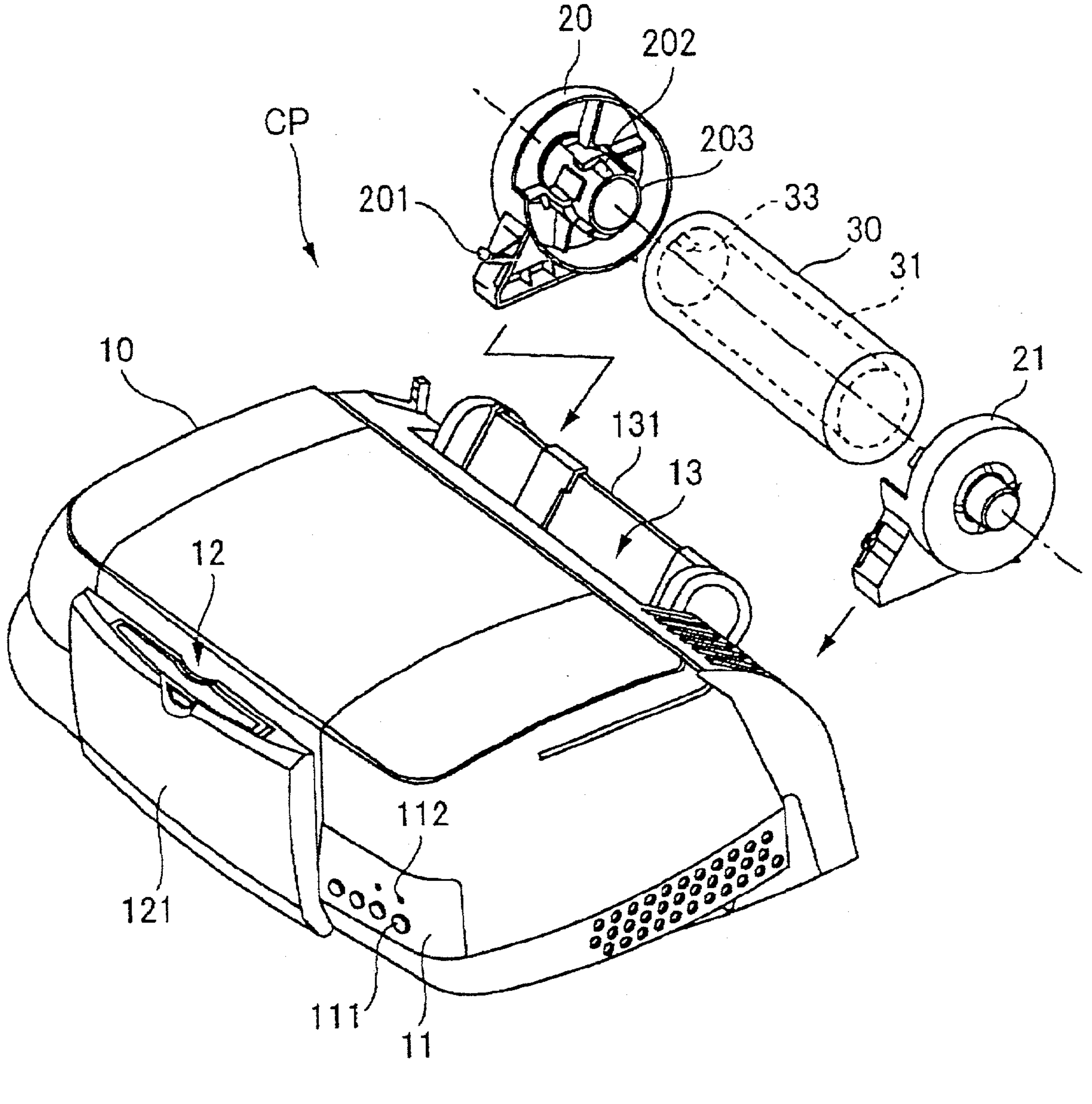
FIG. 1 is a diagram showing a schematic structure of a printing device according to an embodiment.

At least the following matters will be made clear by the explanation in the present specification and the description of the accompanying drawings.

A printing device for printing to a printing medium comprises a printing-medium unit, an ink unit, and a printing device body. Here, the printing-medium unit includes a printing medium on which printing is conducted by a printing device body and by using ink, and printing-medium storage means capable of storing various information. The printing-medium storage means stores printing-medium-type information relating to a type of the printing medium provided in the printing-medium unit. The ink unit contains ink and comprises ink storage means capable of storing various information, the ink storage means storing ink-type information relating to a type of the ink contained in the ink unit. The printing-medium unit and the ink unit are attachable/detachable to/from the printing device body, and the printing device body reads-in the printing-medium-type information and the ink-type information, and determines suitability between the printing medium provided in the printing-medium unit and the ink contained in the ink unit.

According to such a printing device, printing-medium-type information relating to the type of the printing medium provided in the printing-medium unit and which is stored in the printing-medium storage means, and ink-type information relating to the type of ink contained in the ink unit and which is stored in the ink storage means are read into the printing device body, and suitability between the printing medium provided in the printing-medium unit and ink contained in the ink unit is determined; thus, it is possible to realize a printing device which can effectively prevent printing using a printing medium and ink which are not suitable.

If the printing device body determines that the printing medium provided in the printing-medium unit is not suitable to the ink contained in the ink unit, it may give a warning message.

According to such a printing device, the warning message is given when it is determined that the printing medium provided in the printing-medium unit and the ink contained in the ink unit are not suitable to each other; thus, it is possible to realize a printing device where a user may effectively understand that the printing medium and ink are not suitable to each other.

The printing device body may have information which indicates suitability between various printing media and various ink, and may determine the suitability based on this information.

According to such a printing device, the printing device body contains information indicating suitability between the various printing media and the various ink; thus, it is advantageous in that information indicating suitability does not have to be stored in storage means provided on the printing-medium unit and storage means provided on the ink unit.

The printing-medium storage means stores information which indicates suitability between various printing media and various ink, and based on this information, the printing device body may determine the suitability.

According to such a printing device, the printing-medium storage means stores information indicating suitability between various printing media and various ink; thus it is advantageous in that information showing suitability may be stored at the time of manufacturing a printing-medium unit.

The ink storage means stores information indicating suitability between various printing media and various ink, and based on this information, the printing device body may determine the suitability.

According to such a printing device, the ink storage means stores information indicating suitability between various printing media and various ink; thus, it is advantageous in that information showing suitability may be stored at the time of manufacturing the ink unit.

The printing device body may be made so that an ink unit storing pigment ink and an ink unit storing dye ink are attachable/detachable respectively.

According to such a printing device, it may be possible to realize a printing device which may effectively prevent printing using pigment ink on a printing medium which is not suitable to pigment ink, and printing using dye ink on a printing medium which is not suitable to dye ink.

The ink unit may further comprise an ink-ejecting head for ejecting ink towards a printing medium.

Further, a printing device for printing on a printing medium includes a printing-medium unit and a printing device body. Here, a printing-medium unit includes a printing medium to which printing is conducted by the printing device body, and printing-medium storage means which may store various information; and the printing-medium storage means stores printing-medium-type information relating to a type of the printing medium provided in the printing-medium unit. The printing device body to/from which the printing-medium unit is attachable/detachable comprises a printing-medium-designating-information input section to which designation information relating to a type of printing medium designated by a user is input, reads in the printing-medium-type information, and determines suitability between the printing medium provided in the printing-medium unit and the designation information input to the printing-medium-designating-information input section.

According to such a printing device, the printing-medium-type information, which relates to the type of the printing medium provided in the printing-medium unit and which is stored in the printing-medium storage means, is read into the printing device body, and the suitability between the printing medium provided in the printing-medium unit and the designation information input to the printing-medium-designating-information input section is determined; thus, it is possible to realize a printing device capable of effectively preventing printing not intended by the user to be carried out to the printing medium.

The printing device body may give a warning message when it determines that the printing medium provided in the printing-medium unit and the designation information input to the printing-medium-designating-information input section do not match.

According to such a printing device, a warning message is given when the printing medium provided in the printing-medium unit is a printing medium which the user did not intend to use; thus, it is possible to realize a printing device in which the user may effectively recognize that the printing medium provided in the printing-medium unit is not the preferred one.

Further, a printing device for printing on a printing medium comprises an ink unit and a printing device body. The ink unit contains ink and comprises ink storage means which may store various information; and the ink storage means stores ink-type information relating to a type of the ink contained in the ink unit. The printing device body, to/from which the printing-medium unit is attachable/detachable, comprises an ink-designating-information input section to where there is input designation information relating to a type of ink designated by a user, reads in the ink-type information, and determines suitability between the ink contained in the ink unit and the designation information input to the ink-designating-information input section.

According to such a printing device, ink-type information relating to a type of the ink provided in the ink unit and stored in the ink storing means is read into the printing device body, and suitability between the ink provided in the ink unit and the designation information input to the ink-designating-information input section is determined; thus, it is possible to realize a printing device which may effectively prevent printing using ink which the user did not intend to use.

The printing device body may give a warning message when it determines that the ink contained in the ink unit and the designation information input to the ink-designating-information input section do not match.

According to such a printing device, a warning message is given when the ink contained in the ink unit is ink which the user did not intend to use; thus, it is possible to realize a printing device in which the user may effectively recognize that the ink contained in the ink unit is not the intended ink.

In such a printing device, the ink unit may further comprise an ink-ejecting head for ejecting ink towards a printing medium.

A printing method for printing to a printing medium comprises the following steps: a step for a printing device body to read-in printing-medium-type information, the information relating to a type of printing medium and stored in printing-medium storage means provided on a printing-medium unit, the unit comprising a printing medium on which printing is conducted by the printing device body and by using ink; a step for the printing device body to read-in ink-type information, the information relating to a type of ink and stored in ink storage means which is provided on an ink unit, the unit containing ink to be supplied to the printing device body; a step for determining suitability between the printing medium provided in the printing-medium unit and the ink contained in the ink unit based on the printing-medium-type information and the ink-type information which have been read-in; and a step for printing after determining the suitability.

According to such a printing method, printing-medium-type information relating to a type of printing medium provided in the printing-medium unit and stored in the printing-medium storage means, and ink-type information relating to a type of ink contained in the ink unit and stored in the ink storage means are read into the printing device body, and suitability between the printing medium provided in the printing-medium unit and the ink contained in the ink unit is determined; thus, it is possible to realize a printing method which may effectively prevent printing using a printing medium and ink which are not suitable to each other.

A printing method for printing to a printing medium comprises the following steps: a step for a printing device body to read-in printing-medium-type information, the information relating to a type of printing medium and stored in printing-medium storage means which is provided on a printing-medium unit, the unit including a printing medium on which printing is conducted by the printing device body and by using ink; a step for determining suitability between the printing medium provided in the printing-medium unit and information relating to a type of printing medium designated by a user based on the printing-medium-type information which has been read-in; and a step for printing after determining the suitability.

According to such a printing method, printing-medium-type information relating to a type of printing medium provided in the printing-medium unit and stored in the printing-medium storage means is read into the printing device body, and suitability between the printing medium provided in the printing-medium unit and designation information input to the printing-medium-designating-information input section is determined; thus, it is possible to realize a printing method which may effectively prevent printing on a printing medium which the user does not intend to use.

A printing method for printing on a printing medium comprises the following steps: a step for a printing device body to read-in ink-type information, the information relating to a type of ink and stored in ink storage means provided on an ink unit, the unit containing ink to be supplied to the printing device body; a step for determining suitability between the ink contained in the ink unit and information relating to a type of ink designated by a user based on the ink-type information which has been read-in; and a step for printing after determining the suitability.

According to such a printing method, ink-type information relating to a type of ink provided in the ink unit and stored in the ink storage means is read into the printing device body, and suitability between the ink provided in the ink unit and designation information input to the ink-designating-information input section is determined; thus, it is possible to realize a printing method which may effectively prevent printing using ink which is not the user's intended one.

Further, it is possible to realize a computer system which has at least one printing device among the above printing devices, a computer body, a display device, and an input device.

First Embodiment

Schematic Structure of Printing Device

First, referring to FIG. 1, explanation will be made mainly of an external schematic structure of a printing device according to this embodiment. FIG. 1 shows a schematic structure of a printing device according to this embodiment.

FIG. 1 shows a color printer CP as an example of a printing device. Note that, this color printer CP comprises: a printer body 10 as a printing device body; and a roll-paper unit 30 detachably mounted to this printer body 10 and serving as a printing-medium unit.

The color printer CP is a printer which can output color images, and is an ink-jet-type printer which forms images by discharging color inks of four colors, for example, cyan (C), magenta (M), yellow (Y), and black (B) on a printing medium such as roll paper and forming dots therewith. Note that, as color ink, in addition to the above four colors, light cyan (pale cyan, LC), light magenta (pale magenta, LM), dark yellow (dim yellow, DY) may be used.

As shown in FIG. 1, the color printer CP has a structure to discharge a printing medium, such as a printing paper, from the front side thereof, the printing medium having been supplied from the back of the printer. An operation panel 11 and a paper-discharging section 12 are provided on the front side of the printer body 10; and a paper-supplying section 13 is provided on the back of the printer 10.

The operation panel 11 is provided with various operation buttons 111 and indicator lamps 112. The paper-discharging section 12 is provided with a paper-discharging tray 121 which covers the paper-discharging opening when it is not in use. The paper-supplying section 13 is provided with a paper-feed holder 131 for holding cut sheets (not shown), and roll-paper-unit holders 20, 21 for holding the roll-paper unit 30.

The roll-paper unit 30 comprises: a core 31; print roll paper 32 wrapped around the outer periphery of the core 31; and a storage element (storage member) 33 as storage means provided on the inner periphery of the core 31. Note that, details of the storage element 33 are described later.

The roll-paper-unit holders 20, 21 are arranged on both sides at the back of the printer body 10 so as to form a pair.

One of the roll-paper-unit holders 20, 21, the roll-paper-unit holder 20 in this embodiment, is provided with: an electrical contact point 201; and a transmitting/receiving section 202 which is electrically connected to the electrical contact point 201 and is for transmitting/receiving data to/from the storage element 33 of the roll-paper unit 30. Note that, in FIG. 1, in order to show the contact point 201 and the transmitting/receiving section 202 provided on the roll-paper-unit holder 20, the roll-paper-unit holders 20, 21 are shown in a state detached from the printer body 10 and the roll-paper unit 30.

Structure of Storage Element 33 Provided on Roll-Paper Unit 30

Figure 2:
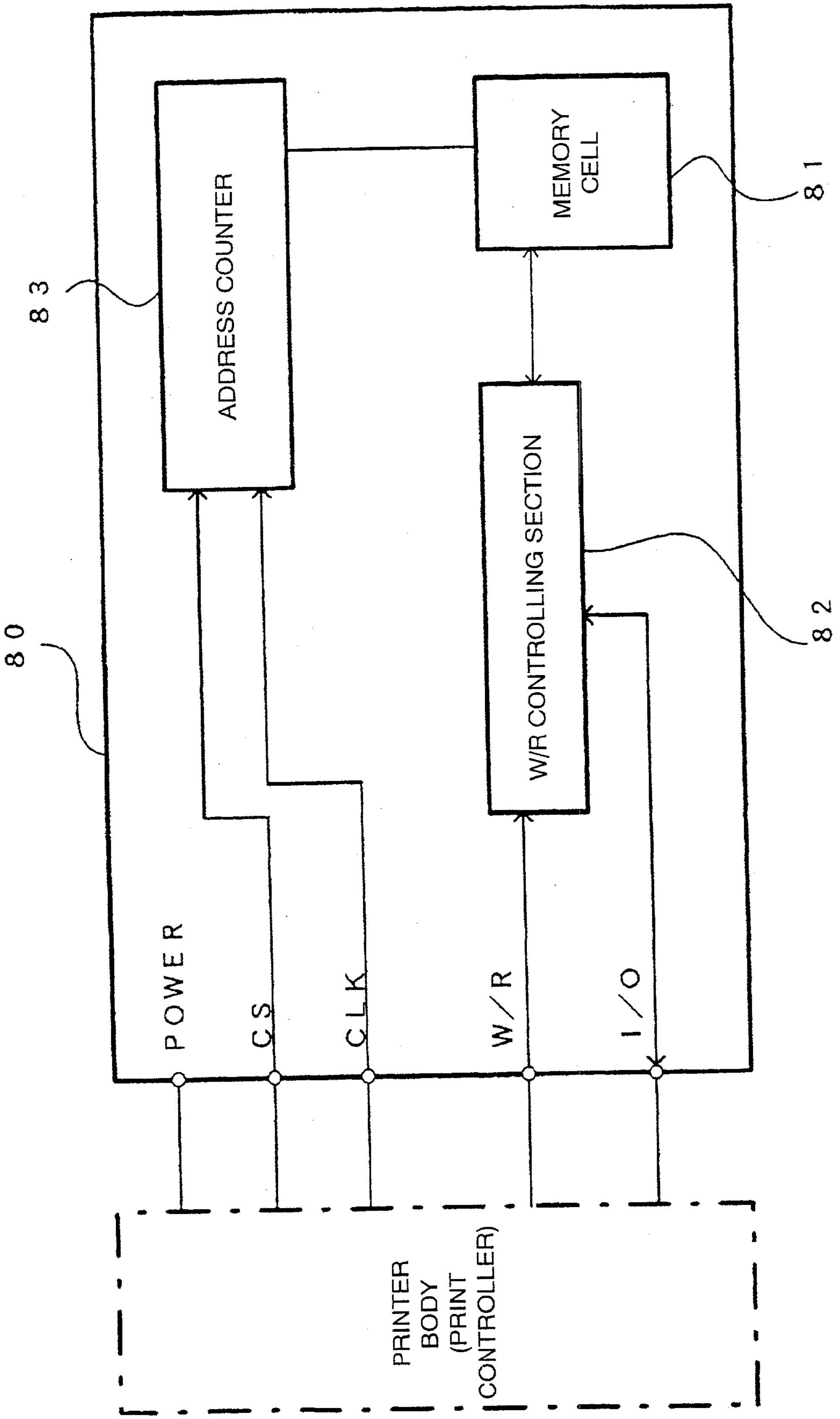
FIG. 2 is a block diagram showing a structure of a storage element 33.

Next, referring to FIG. 2 and FIG. 3, explanation will be made of a structure of the storage element 33 provided on roll-paper unit 30. FIG. 2 is a block diagram showing a structure of the storage element 33. FIG. 3 is a diagram showing data arrangement in a memory cell 336 provided in the storage element 33.

As shown in FIG. 2, the storage element 33 comprises: the memory cell 336; a W/R controlling section 334 for controlling read in and write in of data from/to this memory cell 336; and an address counter 332 for designating an address in the memory cell 336 based on a clock signal CLK when reading in or writing in data with the W/R controlling section 334. Note that, reading in and writing in of data with the W/R controlling section 334 is conducted serially.

As shown in FIG. 3, the memory cell 336 includes: a rewritable region 338 in which data can be read in and rewritten; and a non-rewritable region 339 in which data can be read in but cannot be rewritten. Here, the rewritable region 338 is structured by an EEPROM (Electrically Erasable Programmable Read Only Memory) which is a ROM in which data can be erased and be rewritten. The non-rewritable region 339 is structured by a one-time ROM which is a ROM that may be written-in only once.

Writing-in to the non-rewritable region 339 is conducted before the roll-paper unit 30 is mounted to the printer body 10. Writing-in is conducted, for example, when the roll-paper unit 30 is being manufactured at a factory, or the like. Therefore, the printer body 10 may conduct both read-out and write-in of data in respect to data which is stored in the rewritable region 338; but in respect to the non-rewritable region 339, read-in of data may be conducted, but write-in of data cannot be conducted.

Data stored in the rewritable region 338 is 8-bit information for each address, and is paper-remaining-amount information, start-of-use information, and end-of-use information. The paper-remaining-amount information is information indicating a remaining amount of print roll paper 32 which the roll-paper unit 30 comprises. Note that, in the example shown in FIG. 3, addresses "00H" and "01H" are allotted to paper-remaining-amount information, but just the address "00H" may be allotted to the paper-remaining-amount information. The start-of-use information is information indicating the latest date on which the printer body 10 started using the roll-paper unit 30. The end-of-use information is information indicating the latest date on which the printer body 10 ended using the roll-paper unit 30. Note that, the rewritable region 338 may appropriately store information other than the above-mentioned paper-remaining-amount information, the start-of-use information, and the end-of-use information. Here, among the above-mentioned paper-remaining-amount information, the start-of-use information, and the end-of-use information, the paper-remaining-amount information is arranged as a first address. Therefore, when the printer body 10 reads out information stored in the memory cell 336 serially, the paper-remaining-amount information is read out first.

Data stored in the non-rewritable region 339 is 8-bit information for each address, and is: paper-type information; paper-thickness information; paper-color information; paper-width information; paper-surface-quality information; and manufacturing-date information. The paper-type information is information relating to a type of paper (plain paper, photo paper and the like). The paper-thickness information is information relating to the thickness of paper. The paper-color information is information relating to the color of the printing surface of paper. The paper-width information is information relating to the width of paper. The paper-surface-quality information is information relating to the surface quality of the printing surface of paper. The manufacturing-date information is information relating to the date when the print roll was manufactured. Note that, the rewritable region 339 may appropriately store information other than the paper-type information, the paper-thickness information, and the like.

Note that, in this embodiment, the memory cell 338 is structured to include the rewritable region 338 in which data may be read in and be rewritten, and the non-rewritable region 339 in which data may be read in but may not be rewritten; however, all the regions of the memory cell 336 may be the rewritable region. In such a case, the memory cell 336 may be structured by an EEPROM (Electrically Erasable Programmable Read Only Memory) which is a ROM in which data may electrically be erased and be rewritten.

Positional Relationship of Storage Element 33 and Transmitting/Receiving Section 202

Figure 4:
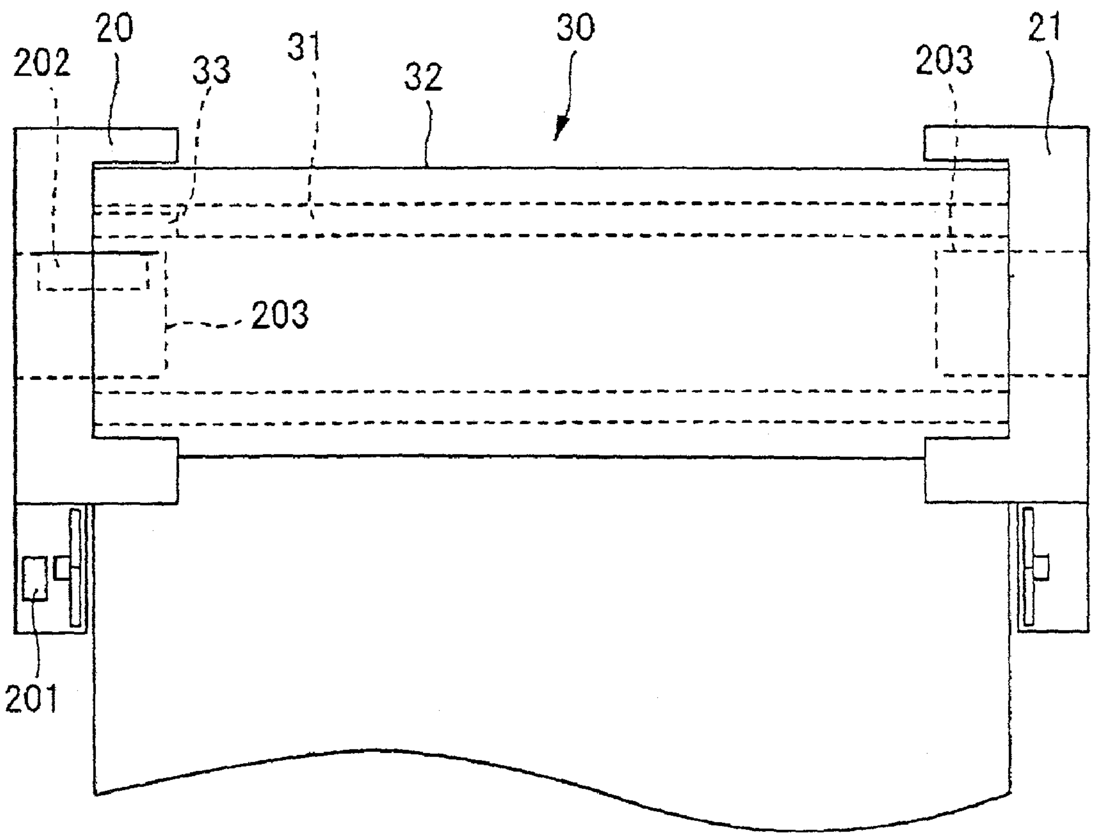
FIG. 4 is an explanatory diagram showing a positional relationship between the storage element 33 and a transmitting/receiving section 202 in a state a roll-paper unit 30 is held by roll-paper-unit holders 20, 21.
Figure 5:
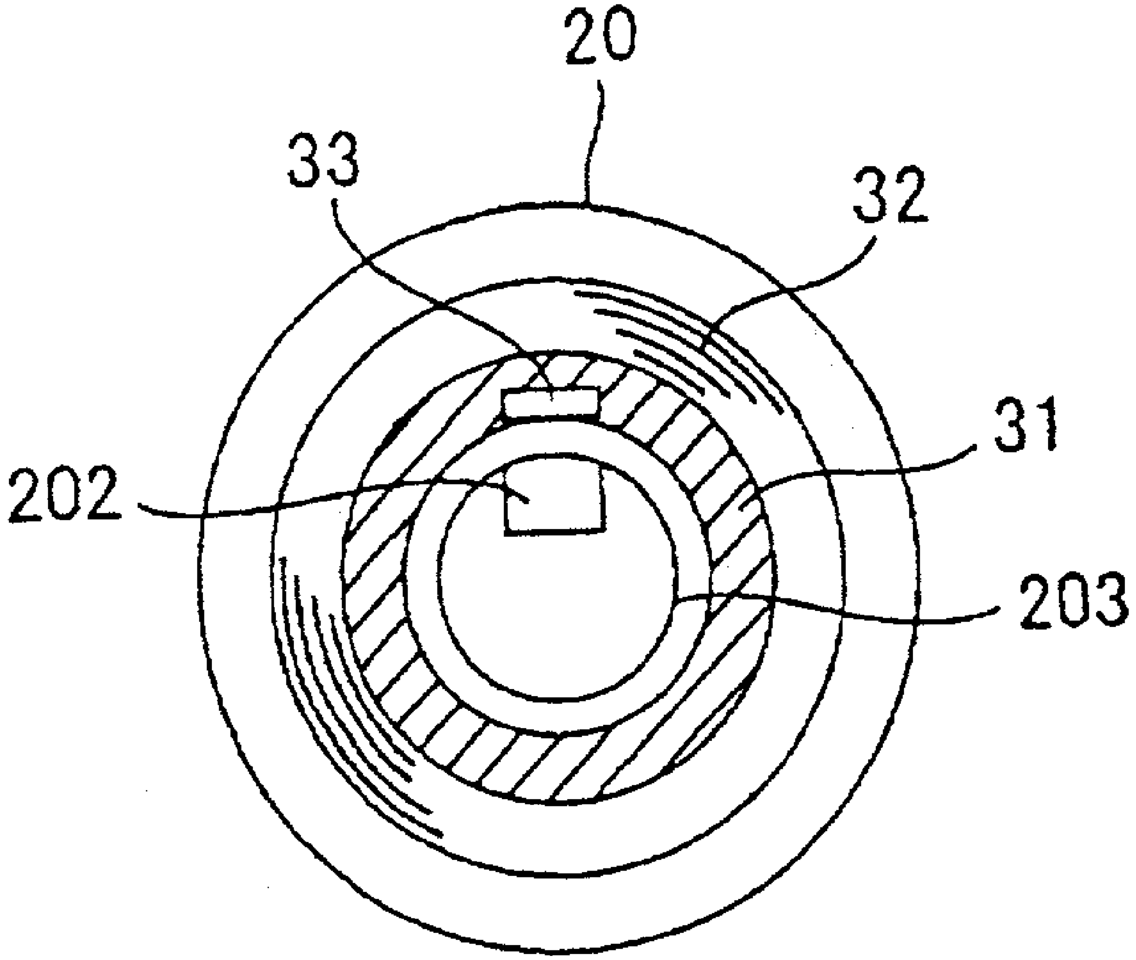
FIG. 5 is a side view of FIG. 4 seen from the roll-paper-unit holder 20 side.

Next, referring to FIG. 4 and FIG. 5, explanation will be made of a positional relationship of the storage element 33 of the roll-paper unit 30 and the transmitting/receiving section 202 of the roll-paper-unit holder 20. FIG. 4 is a diagram showing a positional relationship of the storage element 33 and the transmitting/receiving section 202 in a state where the roll-paper unit 30 is held by the roll-paper-unit holders 20 and 21. FIG. 5 is a side view of FIG. 4 seen from the roll-paper-unit holder 20 side.

In this embodiment, a non-contact-type storage element is used as the storage element 33, and it is not necessary for the storage element 33 and the transmitting/receiving section 202 to contact each other when transmitting and receiving data. Therefore, as shown in FIG. 4 and FIG. 5, there is a clearance between the transmitting/receiving section 202 and the storage element 33. Further, with the non-contact-type storage element, a carrier wave sent from an external transmitting/receiving circuit is rectified to generate necessary electric power.

Each time the roll-paper unit 30 rotates once, the storage element 33 of the roll-paper unit 30 approaches most to the transmitting/receiving section 202 of the roll-paper-unit holder 20. When a close-type storage element with a transmittable and receivable distance of approximately 2 mm is used as the storage element 33, transmitting and receiving of data is conducted at a timing where the storage element 32 and the transmitting/receiving section 202 are the nearest. Further, when a neighboring-type storage element with a transmittable and receivable distance of approximately 20 cm is used, transmitting and receiving of data is conducted unrelated to the relative position of the storage element 33 and the transmitting/receiving section 202. Note that, it is without saying that a contact-type storage element may be used as the storage element 33. In such a case, the roll-paper-unit holder 20 is provided with a contact point instead of the transmitting/receiving section 202, and when the roll-paper unit 30 rotates so that the contact point on the roll-paper-unit holder 20 side and the contact point of the storage element are in contact, data is transmitted and received.

Internal Structure of Color Printer CP

Figure 6:
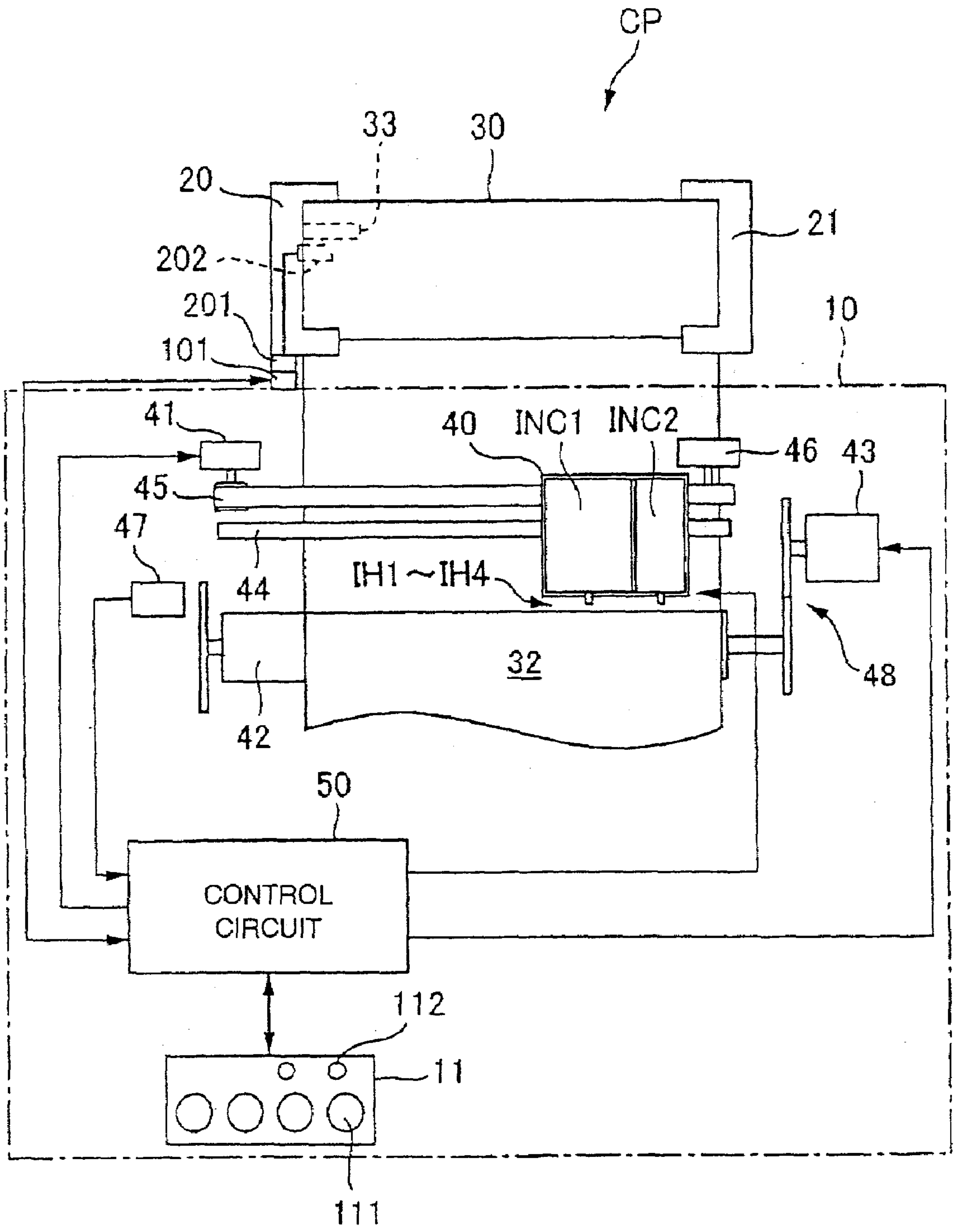
FIG. 6 is a diagram showing an internal structure of a color printer CP according to this embodiment.

Next, referring to FIG. 6, explanation will be made of an internal structure of a color printer CP. FIG. 6 is a diagram showing an internal structure of a color printer CP according to this embodiment.

As shown in the figure, the color printer CP has: a mechanism for driving print heads (ink-ejecting heads) IH1 through IH4 mounted on the carriage 40 to eject ink and form dots; a mechanism for reciprocating this carriage 40 by a carriage motor 41 in an axial direction of a platen 42; a mechanism for carrying the print roll paper 32 supplied from the roll-paper unit 30 by a paper-feed motor 43; and a control circuit 50.

The mechanism for reciprocating the carriage 40 in the axial direction of the platen 42 is structured of, for example: a sliding shaft 44 slidably holding the carriage 40 and provided in parallel to the shaft of the platen 42; and a pulley 46 which provides an endless drive belt 45 stretched in between the carriage motor 41 and itself.

The mechanism for carrying the print roll paper 32 supplied from the roll-paper unit 30 includes: the platen 42; the paper-feed motor 43 for rotating the platen 42; a not-shown auxiliary paper-feed roller; a gear mechanism 48 for transmitting rotation of the paper-feed motor 43 to the platen 42 and the auxiliary paper-feed roller; and an encoder 47 for detecting an angle of rotation of the platen 42. Further, opposing the contact point 201 provided on the roll-paper-unit holder 20 is a contact point 101 provided on the printer body 10.

The control circuit 50 transmits and receives signals with the operation panel 11 of the printer, and appropriately controls the movement of the paper-feed motor 43, the carriage motor 41, and the print heads IH1 through IH4. The print roll paper 32 of the roll-paper unit 30 held by the roll-paper-unit holders 20, 21 of the color printer CP is set to be grasped in between the platen 42 and the auxiliary paper-feed roller, and is carried for a predetermined amount according to the angle of rotation of the platen 42.

The carriage 40 is mounted with an ink cartridge INC1 and an ink cartridge INC2 as ink units. The respective ink cartridges INC1 and INC2 comprise a storage element 80 which stores the type of ink, the remaining amount of ink, or the like. The ink cartridge INC2 contains black (K) ink, and the ink cartridge INC1 contains other ink, that is, the three ink colors of cyan (C), magenta (M), and yellow (Y). Inks of light cyan (LC), light magenta (LM), dark yellow (DY) may also be stored as already mentioned.

Structure of Ink Cartridge and Cartridge-mounting Section

Figure 7A:
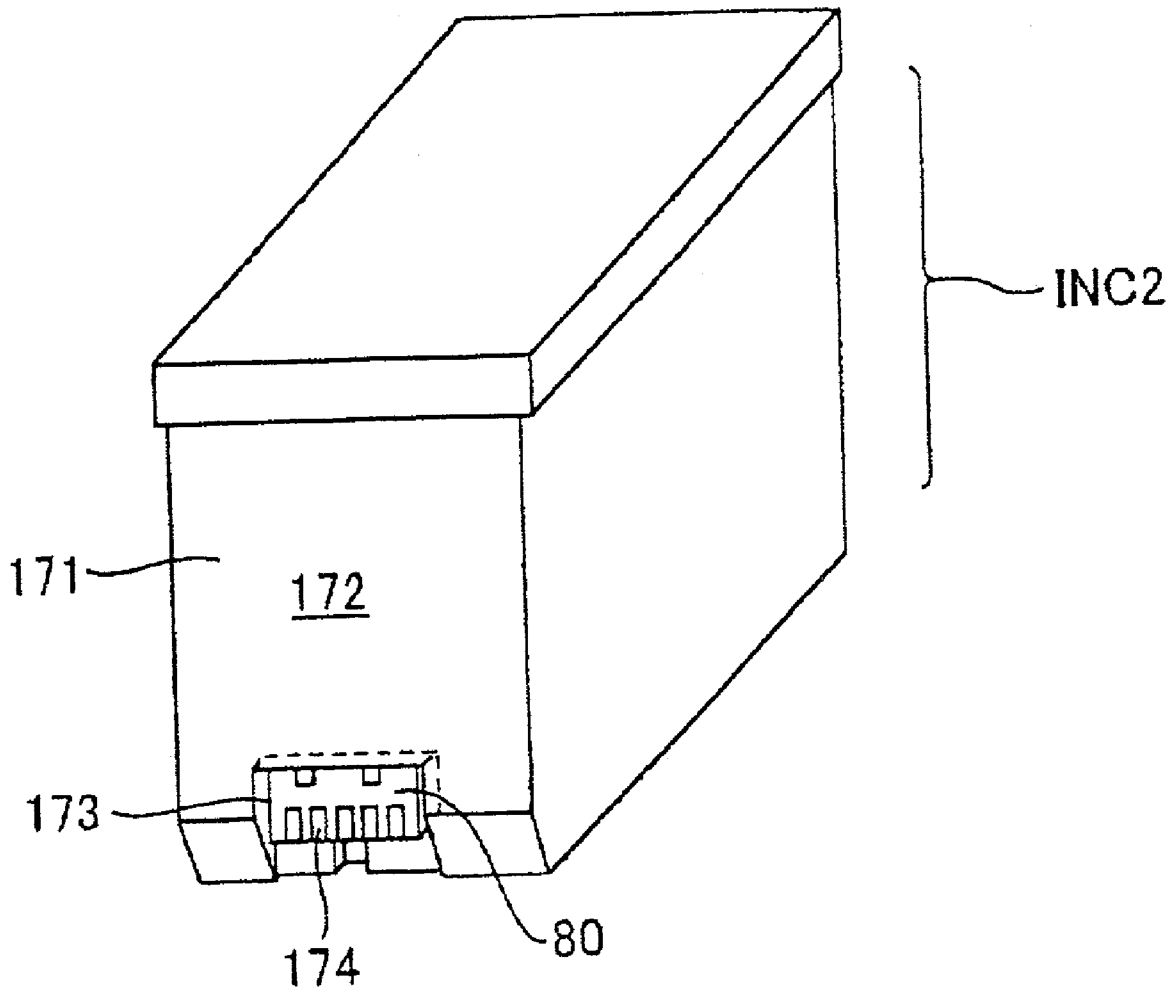
FIG. 7A is a perspective view showing a schematic structure of an ink cartridge.
Figure 7B:
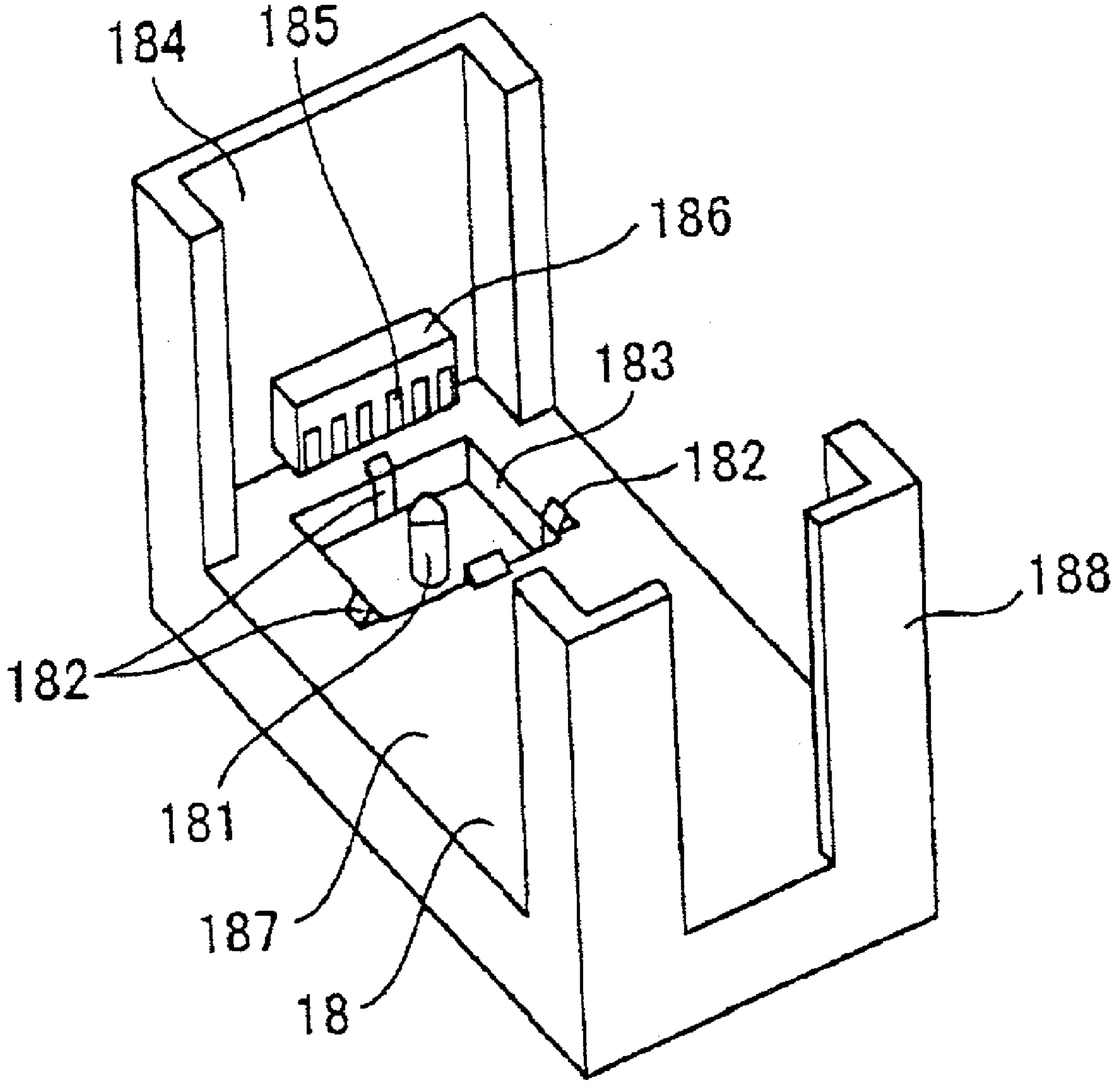
FIG. 7B is a perspective view showing a schematic structure of a cartridge-mounting section of a printer body 10.
Figure 8:
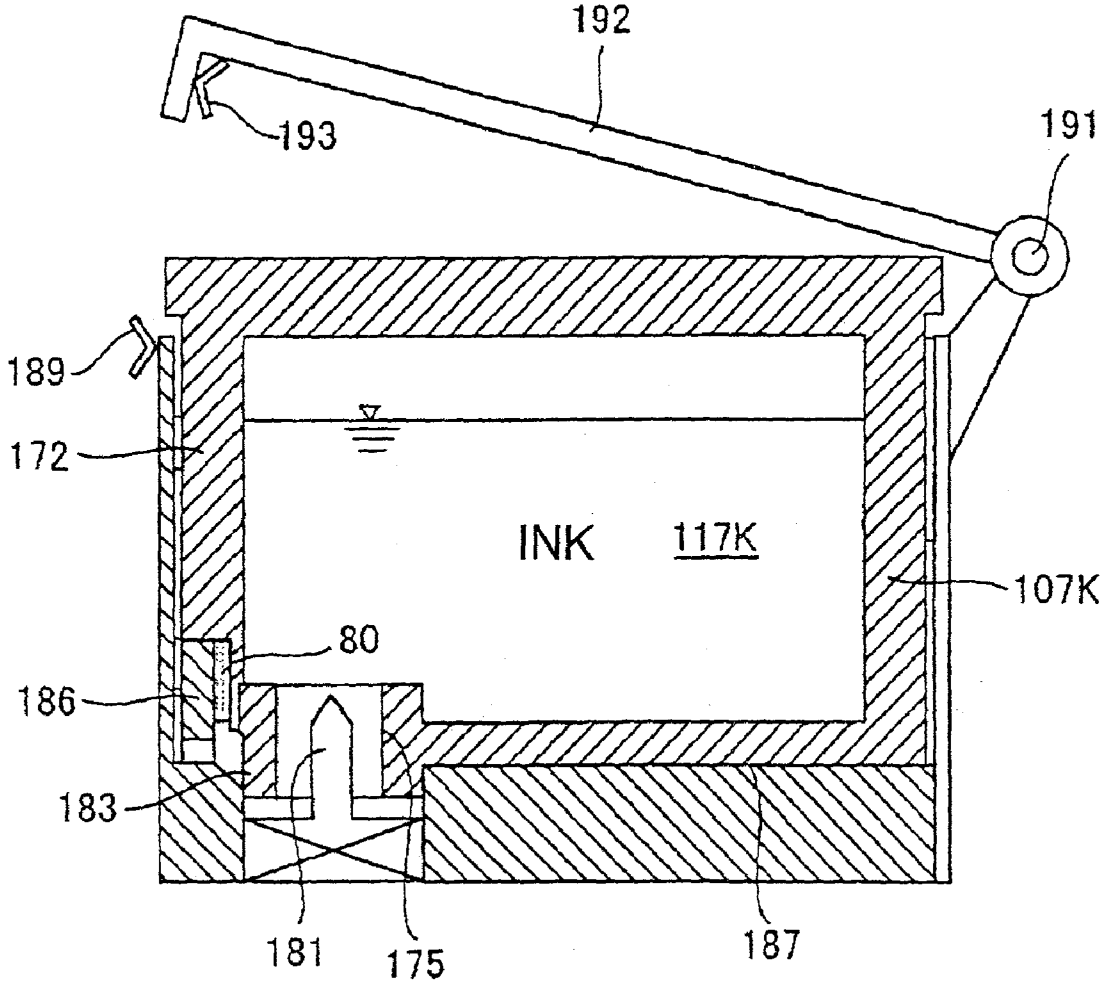
FIG. 8 is a sectional view showing an internal structure of an ink cartridge, an internal structure of a cartridge-mounting section on a carriage 40, and a manner of mounting a cartridge in the cartridge-mounting section.

In a color printer CP structured in this way, the basic structures of the ink cartridges INC1 and INC2 as ink units are common. Referring to FIG. 7A, FIG. 7B, and FIG. 8, taking the ink cartridge INC2 for black ink as an example, explanation will be made of a structure of an ink cartridge and a structure for mounting this cartridge to the printer body 10.

FIG. 7A is a perspective view showing a schematic structure of the ink cartridge. FIG. 7B is a perspective view showing a schematic structure of a cartridge-mounting section of the printer body 10. FIG. 8 is a sectional view showing an internal structure of this ink cartridge, an internal structure of the cartridge-mounting section on the carriage 40, and the manner of mounting a cartridge to the cartridge-mounting section.

In FIG. 7A, the ink cartridge INC2 comprises: a synthetic-resin cartridge body 171 structuring an ink-containing section 117K which contains ink internally; and a storage element 80 (storage means) incorporated in a side frame section 172 of the cartridge body 171. When the ink cartridge INC2 is mounted to a cartridge-mounting section 18 of the printer body 10, this storage element 80 exchanges various data with the printer body 10. This storage element 80 is mounted in a recess 173 opening downwards in view of the side frame section 172 of the ink cartridge INC2, so that only a plurality of connecting terminals 174 are exposed.

As compared to the above, the cartridge-mounting section 18 is provided with a needle 181 facing upwards at a bottom portion 187 of a space to which the ink cartridge INC2 is mounted. The periphery of this needle 181 is made to be a recess 183 for receiving an ink-supplying section 175 formed in the ink cartridge INC2. On the inner walls of this recess 183, there are formed cartridge guides 182 at three points. At an inner wall 184 of the cartridge-mounting section 18, there is placed a connector 186, and this connector 186 is formed with a plurality of electrodes 185 which are electrically connected to each of the plurality of connecting terminals 174 of the storage element 80 when the ink cartridge INC2 is mounted to the cartridge-mounting section 18.

Next, explanation will be made of the procedures for mounting the ink cartridge INC2 to the cartridge-mounting section 18. First, the ink cartridge INC2 is placed in the cartridge-mounting section 18. On a back wall section 188 of the cartridge-mounting section 18 is attached a fixing lever 192 by a supporting shaft 191. When this fixing lever 192 is brought down so as to cover the ink cartridge INC2, the ink cartridge INC2 is pushed downwards so the ink-supplying section 175 fits into the recess 183, and the needle 181 pierces the ink-supplying section 175 to make ink supply possible. Further, when the fixing lever 192 is brought down, a clamping section 193 formed at the tip of the fixing lever 192 engages an engaging section 189 formed on the cartridge-mounting section 18, and the ink cartridge INC2 is fixed. In this state, the plurality of connecting terminals 174 of the storage element 80 of the ink cartridge INC2, and the plurality of electrodes 185 of the cartridge-mounting section 18 electrically connect each other, so that transmitting and receiving of data may be conducted between the printer body 10 and the storage element 80.

The structure of the ink cartridge INC2 is basically the same as the color-ink cartridge INC1; thus, explanation is omitted. However, with the color-ink cartridge INC1, ink of five colors are filled in each ink-containing room, and these ink must follow separate paths respectively to be supplied to the print heads. Therefore, for the color-ink cartridge INC1, there are formed ink-supplying sections 175 for the number of colors of ink. Note that the ink cartridge INC1 contains ink of 5 colors, but only one storage element 80 is incorporated therein, and this single storage element 80 stores together information of the ink cartridge INC1 and information of the respective ink colors.

Structure of Storage Element 80 Provided on Ink Cartridge

Figure 9:
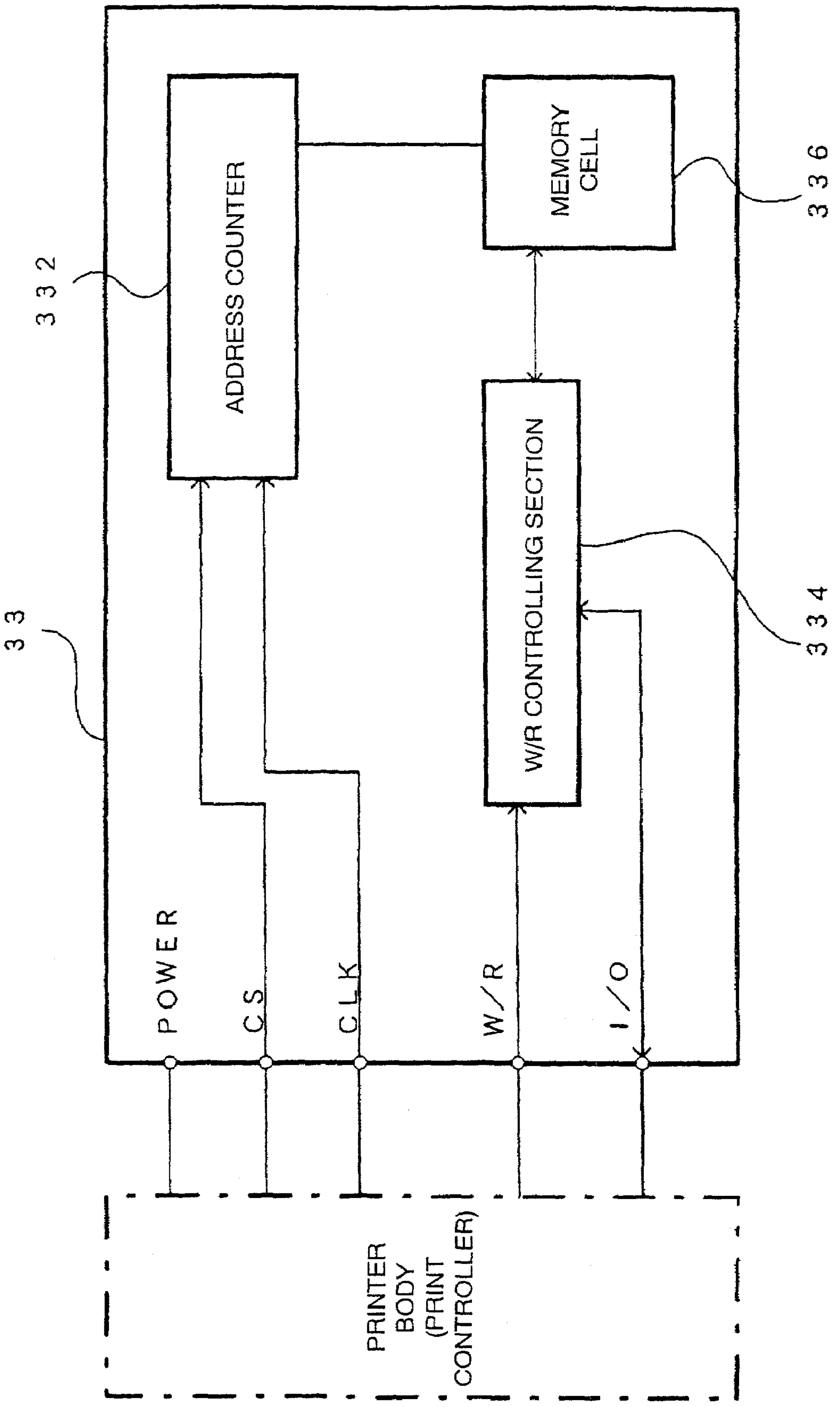
FIG. 9 is a block diagram showing a structure of a storage element 80.
Figure 10:
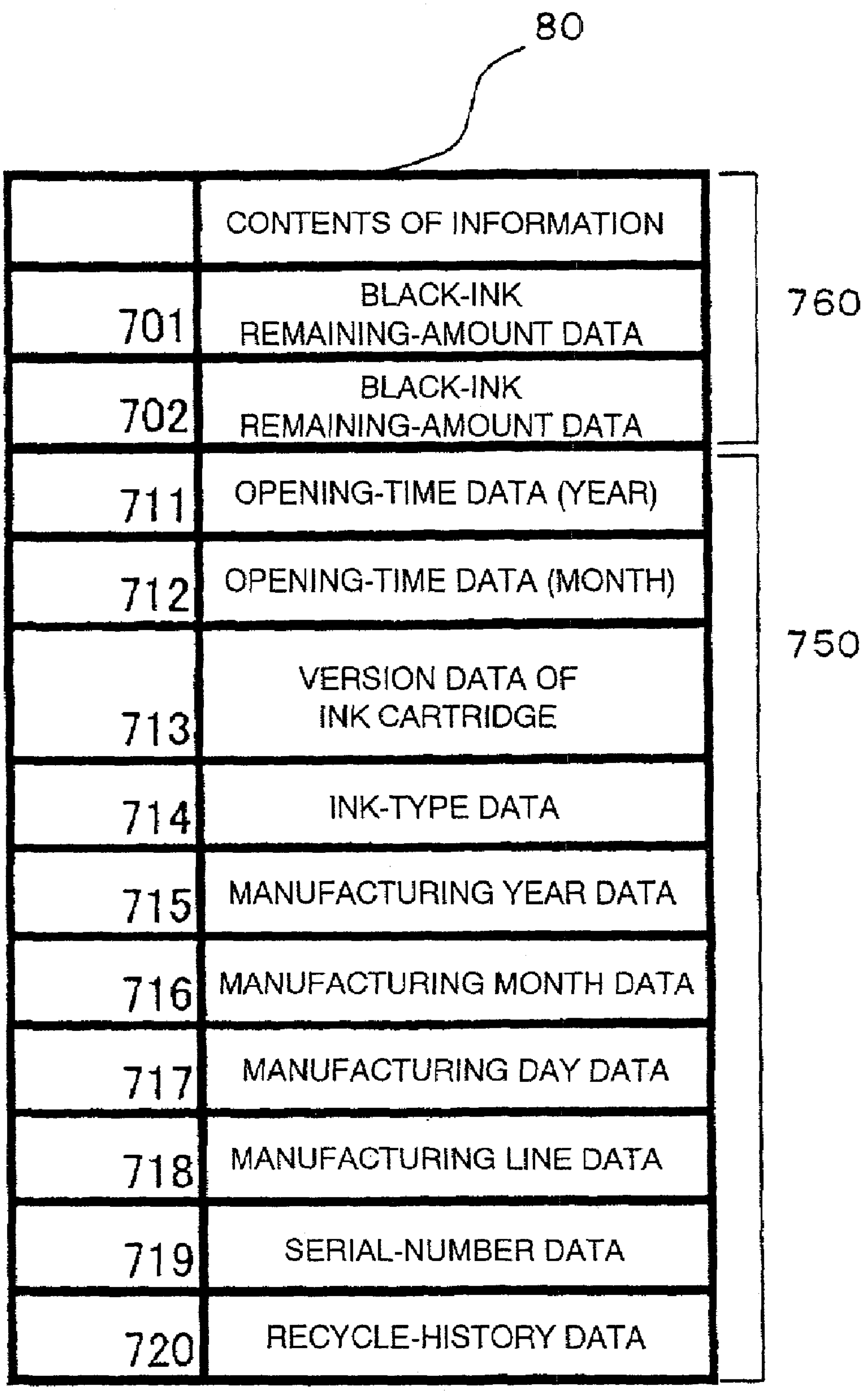
FIG. 10 is an explanatory diagram showing data arrangement of a storage element incorporated in a black-ink cartridge INC2.

FIG. 9 is a block diagram showing a structure of the storage element 80 incorporated in the ink cartridges INC1, INC2 used in the color printer CP of this embodiment. FIG. 10 is an explanatory diagram showing data arrangement of the storage element incorporated in the black-ink cartridge INC2 used in the color printer CP of this embodiment. FIG. 11 is an explanatory diagram showing data arrangement of the storage element incorporated in the color-ink cartridge INC1.

In both ink cartridges INC1, INC2, there is incorporated a storage element 80 and there is formed an ink-containing section for containing ink inside. In this embodiment, the storage element 80 comprises: a memory cell 81; a read/write controlling section 82 for controlling reading and writing of data by this memory cell 81; and an address counter 83 for incrementing upon reading and writing data between the printer body 10 and the memory cell 81 via the read/write controlling section 82 based on clock signals CLK.

As shown in FIG. 10, the memory cell 81 of the storage element 80 provided in the black-ink cartridge INC2 comprises: a first storage region 750 for storing read-only data; and a second storage region 760 for storing data which may be rewritten. The printer body 10 may only read-out data stored in the first storage region 750, but may conduct both read-out and write-in of data stored in the second storage region 760. The second storage region 760 is arranged to have addresses which are accessed before the first storage region 750 at a time of access. That is, the second storage region 760 is arranged to have a lower address than the first storage region 750. Note that, in this embodiment, "low address" refers to "address at the top".

Here, rewritable data to be stored in the second storage region 760 is the first black-ink remaining-amount data and the second black-ink remaining-amount data allotted respectively to each storage region 701, 702, in the order of access. Black-ink remaining-amount data is allotted to two storage regions 701, 702 so that the data maybe rewritten to these regions alternately. Therefore, if the last rewritten black-ink remaining-amount data is data which is stored in the storage region 701, the black-ink remaining-amount data stored in the storage region 702 is the previous data, and the next rewriting is conducted to this storage region 702.

On the contrary, the read-only data stored in the first storage region 750 is, in the order of access: opening-time data of the ink cartridge INC2 (year); opening-time data of the ink cartridge INC2 (month); version data of the ink cartridge INC2; data of the ink type such as pigment ink or dye ink; manufacturing year data of the ink cartridge INC2; manufacturing month data of the ink cartridge INC2; manufacturing day data of the ink cartridge INC2; manufacturing line data of the ink cartridge INC2; serial-number data of the ink cartridge INC2; recycle-history data indicating whether the ink cartridge INC2 is new or recycled; and these are allotted to respective storage regions 711 to 720.

As shown in FIG. 11, the memory cell 81 of the storage element 80 provided in the color-ink cartridge INC1 also comprises: a first storage region 650 storing read-only data; and a second storage region 660 for storing rewritable data. The printer body 10 may conduct only read-out of data stored in the first storage region 650, and may conduct both read-out and write-in of data stored in the second storage region 660. The second storage region 660 is arranged to have addresses which are accessed before the first storage region 650 at the time of access. That is, the second storage region 660 is arranged to have a lower address than the first storage region 650.

The rewritable data stored in the second storage region 660 is, in the order of access: first cyan-ink remaining-amount data; second cyan-ink remaining-amount data; first magenta-ink remaining-amount data; second magenta-ink remaining-amount data; first yellow-ink remaining-amount data; second yellow-ink remaining-amount data; first light-cyan-ink remaining-amount data; second light-cyan-ink remaining-amount data; first light-magenta-ink remaining-amount data; and second light-magenta-ink remaining-amount data; and these are allotted to the respective storage areas 601 to 610. The reason that ink-remaining-amount data for each color is allotted to two storage regions is to conduct data-rewriting alternately to these regions, as similarly to the black-ink cartridge INC2.

On the contrary, similar to the black-ink cartridge INC2, the read-only data stored in the first storage region 650 is, in the order of access: opening-time data of the ink cartridge INC1 (year); opening-time data of the ink cartridge INC1 (month); version data of the ink cartridge INC1; ink-type data such as pigment ink or dye ink; manufacturing year data; manufacturing month data; manufacturing day data; manufacturing line data; serial-number data; and recycle-history data; and these are allotted to the respective storage areas 611 to 620. These data are common regardless of the color, and data of only one type is stored as common data for the respective colors.

These data are read-out by the printer body 10 when, for example, the power of the printer body 10 is switched ON with the ink cartridges INC1, INC2 mounted on the printer body 10, or when the ink cartridges INC1, INC2 are changed, and then the data are stored in a RAM 53 incorporated in the printer body 10.

In this way, the storage element 80 provided on the ink cartridge stores various information such as information relating to the ink type. Information relating to the ink type may be information such as whether it is dye ink or pigment ink, or may be further subdivided information regarding dye ink and pigment ink.

Internal Structure of Control Circuit

Figure 12:
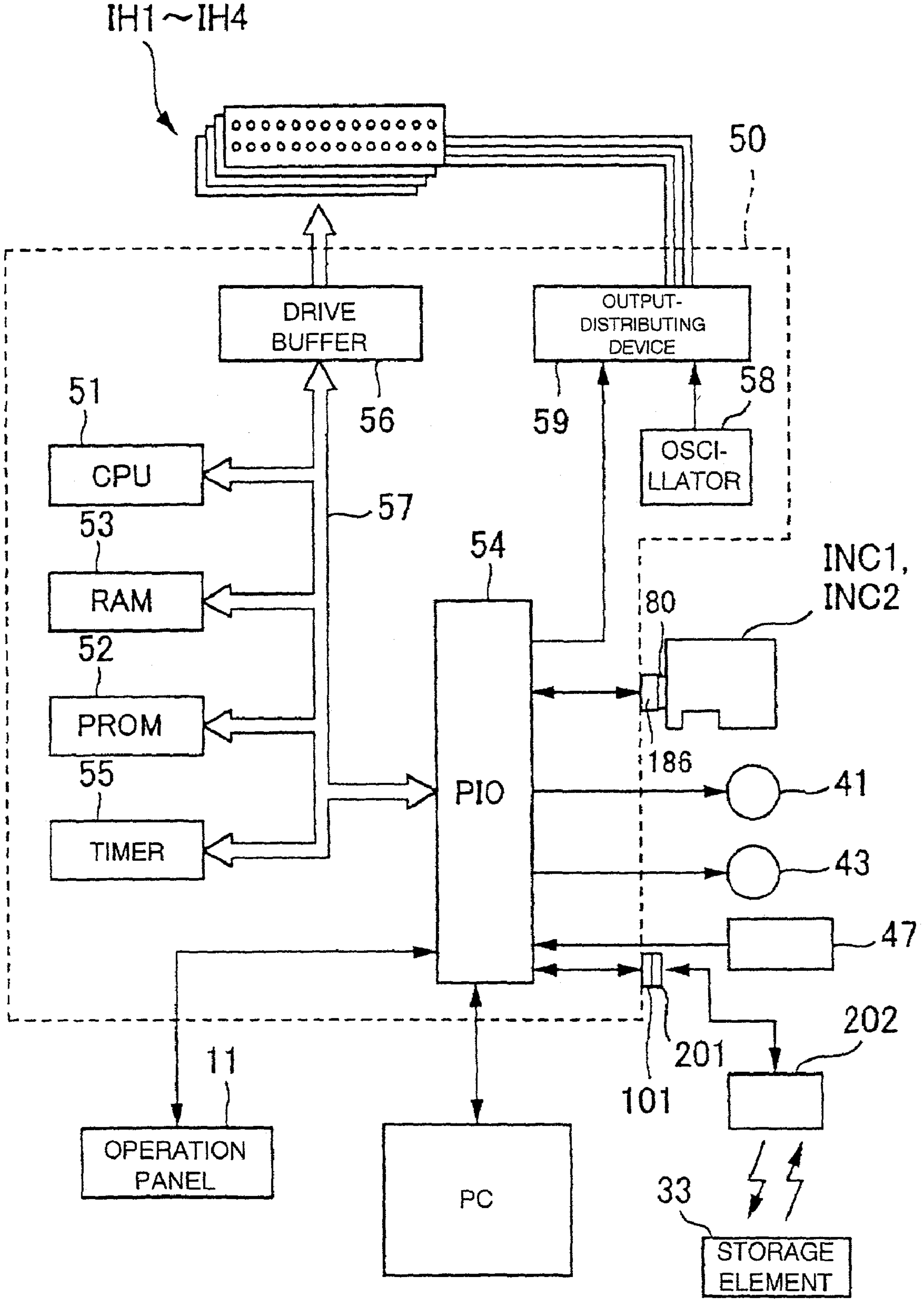
FIG. 12 is a block diagram showing an internal structure of a control circuit of a color printer CP according to the present embodiment.

Next, referring to FIG. 12 and FIG. 13, explanation will be made of an internal structure of a control circuit 50 of the color printer CP. FIG. 12 is a block diagram showing an internal structure of the control circuit 50 of the color printer CP according to this embodiment. FIG. 13 is a diagram showing an example of information stored in a PROM 52.

As shown in FIG. 12, inside the control circuit 50, there are provided, for example: a CPU 51; a PROM 52; a RAM 53; an input/output section for peripheral equipments (PIO) 54; a timer 55; and a drive buffer 56.

Various information are stored in the PROM 52, and in this embodiment, as shown in FIG. 13, information showing suitability between the roll paper and ink is stored.

FIG. 13 shows the suitability between four types of paper (paper A, paper B, paper C, paper D) and three types of ink (ink X, ink Y, ink Z). Specifically, in columns for paper and ink that are in conformity, there is indicated "O"; and in columns for paper and ink that are in nonconformity, there is shown "X".

Note that, information showing suitability between roll paper and ink may be stored in the RAM 53, may be stored in the storage element 33 provided on the roll-paper unit 30, or may be stored in the storage element 80 provided on the ink cartridges INC1, INC2.

The PIO 54 is connected with: a personal computer PC; the connector 186 of the storage element 80 of the ink cartridge; the carriage motor 41; the paper-feed motor 43; the encoder 47; and the transmitting/receiving section 202 via the contact points 101, 201.

The drive buffer 56 is used as a buffer for supplying ON/OFF signals to the print heads IH1 through IH4 to form dots. The buffer and the print heads are connected to each other by a bus 57, in order for reciprocal transmitting and receiving of data to be possible.

The control circuit 50 is provided with: an oscillator 58 for outputting a drive waveform at a predetermined frequency; and an output distributing device 59 for distributing the output from the oscillator 58 to the print heads IH1 through IH4 at predetermined timings.

The control circuit 50 accesses the storage element 33 provided on the core 31 of the roll-paper unit 30 via the transmitting/receiving section 202 at timings, for example, when the power is turned on, when the roll-paper unit 30 is changed, or when the power is turned off. Further, the control circuit 50 accesses the storage element 80 provided on the ink cartridges INC1, INC2 via the transmitting/receiving section 202 at timings, for example, when the power is turned on, when the ink cartridges INC1 and/or INC2 are changed, or when the power is turned off. Information read from the storage element 33 provided on the roll-paper unit 30 and the storage element 80 provided on the ink cartridges INC1, INC2 is stored in the RAM 53.

The control circuit 50 reflects the information obtained from the storage element 33 and the storage element 80, and controls the printing process. In synchronism with the movement of the paper-feed motor 43 and the carriage motor 42, the control circuit 50 outputs data of dots to the drive buffer 56 at a predetermined timing. Details of processing using information obtained from the storage element 33 and the storage element 80 are described later.

Printing Operation using Color Printer CP

Figure 14:
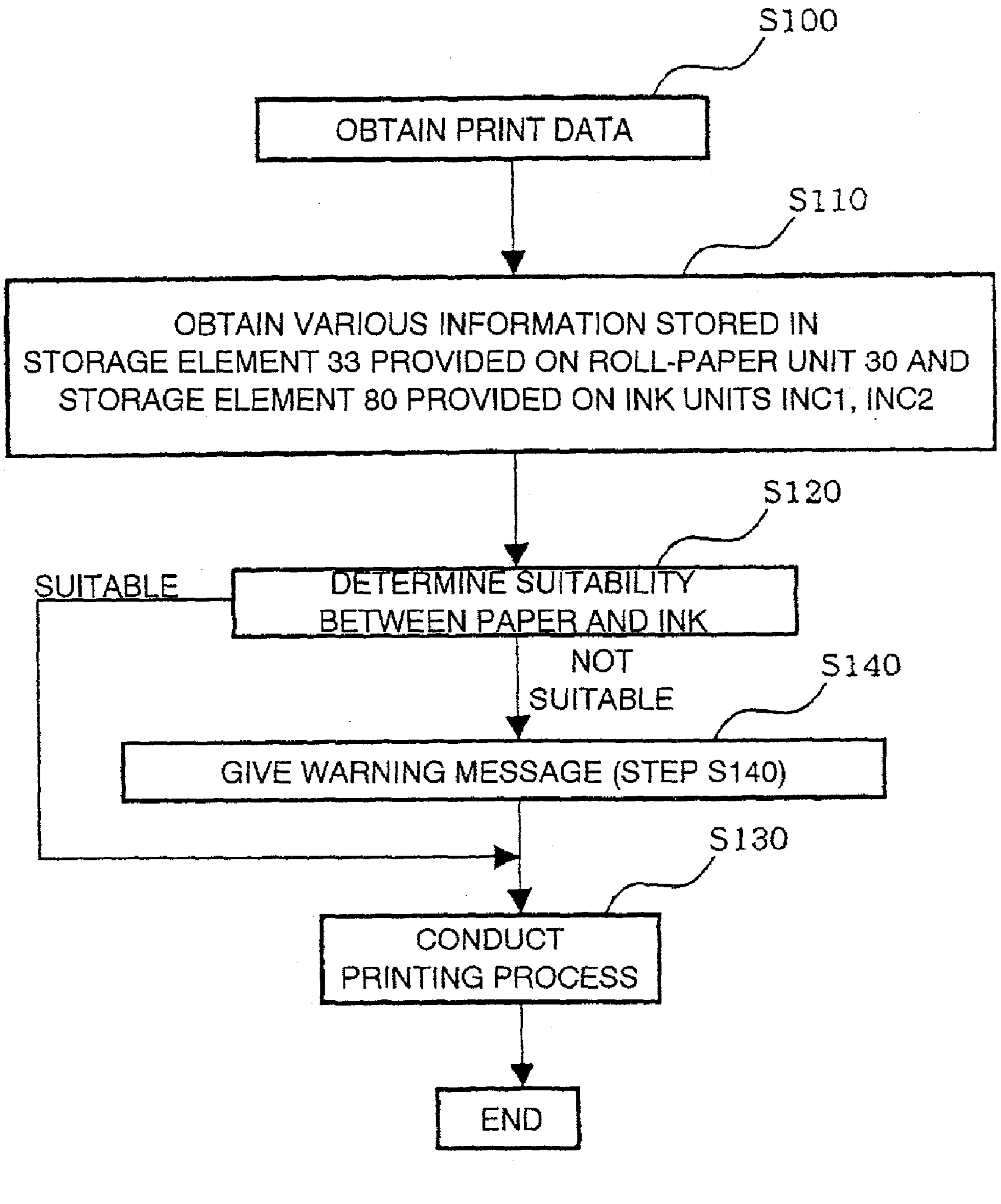
FIG. 14 is a flowchart showing printing processes.

Next, with reference to FIG. 14, explanation will be made of a printing operation using a color printer CP according to this embodiment. FIG. 14 is a flowchart showing a printing process.

After a user produces to-be-printed print data by, for example, processing and editing images and/or creating documents and then instructs printing using an application program operating on a computer, a printer driver incorporated in an operating system which is installed in a computer receives the print data from the application program, and transfers the data to the printer body 10. In this way, the printer body 10 obtains print data (step S100).

The printer body 10 which has obtained the print data obtains various information stored in the storage element 33 provided on the roll-paper unit 30 and the storage element 80 provided on the ink cartridges INC1 and INC2 (step S110), and stores the obtained information in the RAM 53.

Among the various information stored in the RAM 53, the CPU 51 provided in the printer body 10 obtains information relating to the type of the roll paper provided in the roll-paper unit 30, and information relating to the type of ink stored in the ink cartridges INC1, INC2, and determines the suitability between the roll paper provided in the roll-paper unit 30 and the ink contained in the ink cartridges INC1, INC2 (step S120). In determining such suitability, reference is made to information stored in the PROM 52 which indicates suitability between the roll paper and ink.

When it is determined that the roll paper and the ink are suitable to each other, printing process is conducted continuously (step S130).

When it is determined that the roll paper and the ink are not suitable to each other, a warning message is given to the user (step S140). As a method of providing a warning message, there may be a variety of methods, such as: providing a message saying "Paper and ink are not suitable. Do you want to conduct printing?" on a display of a computer which the user is using; and/or showing a similar message on a message-displaying section provided on the printer body 10. Thus, since a warning message is provided when the roll paper provided in the roll-paper unit 30 and the ink contained in the ink cartridges INC1, INC2 are not suitable to each other, the user may effectively recognize the nonconformity between the roll paper and the ink.

After the user changes ink or paper in accordance with the warning message, when the user gives an instruction to continue printing, the color printer CP conducts the printing process (step s130). Note that, it is not mandatory for the user to change ink or paper according to the warning message, and if the user desires to print using ink and paper which are not suitable to each other, the color printer CP conducts a printing process based on the user's instruction to continue printing.

The above processes are strictly an example, and in the above processes, after the printer body 10 obtains print data from the printer body 10 (steps s100), the printer body 10 obtains various information stored in the storage element 33 provided on the roll-paper unit 30 and the storage element 80 provided on the ink cartridges INC1, INC2 (step s110). However, for example, the various information may be obtained from the storage element 33 and the like in parallel with obtaining print data. Further, the various information may be obtained from the storage element 33 and the like at a timing when the roll-paper unit 30 or the ink cartridges INC1, INC2 are changed.

Further, as described above, the information indicating suitability between paper and ink may be stored in the storage element 33 provided on the roll-paper unit 30, or may be stored in the storage element 80 provided on the ink cartridges INC1, INC2.

Further, determining of the suitability between paper and ink may be conducted by a computer connected to the color printer CP.

Second Embodiment

Next, explanation will be made of the second embodiment of the present invention.

The color printer CP according to this embodiment comprises a printing-medium-designating-information input section to which designation information relating to the type of printing medium designated by a user is input.

Other structures are similar to that in the first embodiment, but it is not mandatory for an ink unit which stores ink supplied to the printer body 10 and which comprises the storage element 80 to be attachable/detachable to/from the printer body 10.

The printing-medium-designating-information input section is realized as one function of the PIO 54 in FIG. 12. The user may designate the type of printing medium on a screen of a personal computer PC, and it is structured so that the designation information, relating to the type of printing medium designated by the user, is input to the printing-medium-designating-information input section via various connecting cables or wirelessly. The designation information input to the printing-medium-designating-information input section is stored in the RAM 53 inside the printer body 10.

At the time of the printing process, information relating to the type of roll paper which is stored in the storage element 33 provided on the roll-paper unit 30 is read into the printer body 10. The printer body 10 determines the suitability between the roll paper provided in the roll-paper unit 30 and the designation information input to the printing-medium-designating-information input section. That is, it is determined whether or not the information read into the printer body 10 and the designation information input to the printing-medium-designating-information input section match.

If these pieces of information match, the printing process is conducted as is; but when they do not match, a warning message is given, similar to the first embodiment.

In this way, according to this embodiment, a warning message is given when the type of printing medium designated by the user does not match the type of roll paper provided in the roll-paper unit 30; thus, it is possible to effectively prevent a printing process to be carried out on a roll paper of a type which the user does not intend.

Third Embodiment

Next, explanation will be made of a third embodiment of the present invention.

A color printer CP of this embodiment comprises an ink-designating-information input section to which designation information relating to the type of ink designated by a user is input. The other structures are similar to that in the first embodiment, although it is not mandatory for the roll-paper unit 30 which comprises the storage element 33 to be attachable/detachable to/from the printer body 10.

The ink-designating-information input section is realized as one function of the PIO 54 in FIG. 12. The user may designate the type of ink on a screen of a personal computer, and it is structured so that the designated information, relating to the type of ink designated by the user, is input to the ink-designating-information input section via various connecting cables or wirelessly. The designation information input to the ink-designating-information input section is stored in the RAM 53 inside the printer body 10.

At the time of the printing process, information relating to the type of ink and stored in the storage element 80 provided on the ink cartridges INC1, INC2, which serve as ink units, is read into the printer body 10. The printer body 10 determines the suitability between the ink contained in the ink cartridges INC1, INC2 and the designation information input to the ink-designating-information input section. That is, it is determined whether or not the information read into the printer body 10 and the designation information input to the ink-designating-information input section match.

If both pieces of information match, the printing process is conducted as is; but when they do not match, a warning message is given as in the first embodiment.

In this way, according to this embodiment, a warning message is given when the type of ink designated by the user does not match the type of ink contained in the ink cartridges INC1, INC2; thus, it becomes possible to significantly prevent a printing process to be carried out with an ink type not intended by the user.

Other Embodiments

Up to this point, a printing device or the like according to the present invention has been explained based on several embodiments. However, the above embodiments of the invention are intended for easier understanding of the present invention, and are not intended to limit the present invention. The present invention may be changed and modified without departing from the true spirit, and may of course include equivalents of the present invention.

In the above-described embodiments, the ink cartridges INC1, INC2 as ink units have structures to contain ink, and to comprise storage elements 80 which store the type of the ink, the remaining amount of ink, and the like; but it may be a structure where the ink cartridges INC1, INC2 as ink units contain ink, comprise storage elements 80 storing the type of ink, the remaining amount of ink, and the like, and further comprise ink-ejecting heads for ejecting ink towards the printing medium.

Further, a printing device is explained using an inkjet-type color printer as an example. However, other types of printers may be adopted as the printing device, and the printing device may be structured including a printer and a computer connected thereto.

There may be realized a computer system which comprises: a printer having a printer body and a printing-medium unit detachably mounted to the printer body according to the above embodiment; a computer body; a display device such as a CRT; an input device such as a mouse or a keyboard; a flexible drive device; and a CD-ROM drive device. A computer system realized in this way is a system which is superior to a conventional system as a whole.

A printer which has a printer body and a printing-medium unit which is detachably mounted to the printer body according to the above-described embodiment may be provided with some of the functions or mechanisms of a computer body, a display device, an input device, a flexible disk drive device, and a CD-ROM drive device, respectively. For example, the printer may be a structure having: an image-processing section conducting image processing; a display device for showing various displays; and an attaching/detaching section for a recording medium on which there is recorded image data filmed by, for example, a digital camera.

In the above embodiment, a color printer CP which may use both cut sheets and the roll-paper unit 30 are described as an example. However, the printing device according to this embodiment may be applied to a printer only for roll paper.

According to this embodiment, by determining the compatibility between, for example, the type of printing device and the type of ink, it is possible to realize a printing device, a printing method, and a computer system which may conduct high-quality printing.

What is claimed is:

1. A printing device for printing on a printing medium comprising:

a printing-medium unit including a printing medium on which printing is conducted by a printing device body and by using ink, and printing-medium storage means capable of storing various information, said printing-medium storage means storing printing-medium-type information relating to a type of said printing medium provided in said printing-medium unit, said printing-medium-type information being stored in said printing-medium storage means before said printing-medium unit is attached to said printing device body;

an ink unit containing ink and comprising ink storage means capable of storing various information, said ink storage means storing ink-type information relating to a type of said ink contained in said ink unit, said ink-type information being stored in said ink storage means before said ink unit is attached to said printing device body; and said printing device body to/from which said printing-medium unit and said ink unit are attachable/detachable, said printing device body reading-in said printing-medium-type information and said ink-type information, and determining suitability between said printing medium provided in said printing-medium unit and said ink contained in said ink unit.

2. A printing device according to claim 1, wherein, said printing device body gives a warning message if said printing device body determines that said printing medium provided in said printing-medium unit and said ink contained in said ink unit are not suitable to each other.

3. A printing device according to claim 1, wherein, said printing device body has information which indicates suitability between various printing media and various ink, and determines said suitability based on said information.

4. A printing device according to claim 1, wherein, said printing-medium storage means stores information which indicates suitability between various printing media and various ink, and based on said information, said printing device body determines said suitability.

5. A printing device according to claim 1, wherein, said ink storage means stores information which indicates suitability between various printing media and various ink, and based on said information, said printing device body determines said suitability.

6. A printing device according to claim 1, wherein, an ink unit containing pigment ink, and an ink unit containing dye ink are respectively attachable/detachable to/from said printing device body.

7. A printing device according to claim 1, wherein, said ink unit further comprises an ink-ejecting head for ejecting ink towards a printing medium.

8. A printing method for printing on a printing medium comprising:

a step for a printing device body to read-in printing-medium-type information, said information relating to a type of printing medium and stored in printing-medium storage means provided on a printing-medium unit, said unit comprising a printing medium on which printing is conducted by said printing device body and by using ink, said printing-medium-type information being stored in said printing-medium storage means before said printing-medium unit is attached to said printing device body;

a step for said printing device body to read-in ink-type information, said information relating to a type of ink and stored in ink storage means which is provided on an ink unit, said unit containing ink to be supplied to said printing device body, said ink-type information being stored in said ink storage means before said ink unit is attached to said printing device body;

a step for determining suitability between said printing medium provided in said printing-medium unit and said ink contained in said ink unit based on said printing-medium-type information and said ink-type information which have been read-in; and a step for printing after determining said suitability.

9. A computer system comprising:

a printing device for printing on a printing medium;

said printing device comprising:

a printing-medium unit including a printing medium on which printing is conducted by a printing device body and by using ink, and printing-medium storage means capable of storing various information, said printing-medium storage means storing printing-medium-type information relating to a type of said printing medium provided in said printing-medium unit, said printing-medium-type information being stored in said printing-medium storage means before said printing-medium unit is attached to said printing device body;

an ink unit for storing ink and comprising ink storage means capable of storing various information, said ink storage means storing ink-type information relating to a type of said ink contained in said ink unit, said ink-type information being stored in said ink storage means before said ink unit is attached to said printing device body; and said printing device body to/from which said printing-medium unit and said ink unit are attachable/detachable, said printing device body reading-in said printing-medium-type information and said ink-type information, and determining suitability between said printing medium provided in said printing-medium unit and said ink contained in said ink unit;

a computer body;

a display device; and an input device.

10. A printing device for printing on a printing medium comprising:

a printing-medium unit including a printing medium on which printing is conducted by a printing device body and by using ink, and printing-medium memory capable of storing various information, said printing-medium memory storing printing-medium-type information relating to a type of said printing medium provided in said printing-medium unit, said printing-medium-type information being stored in said printing-medium memory before said printing-medium unit is attached to said printing device body;

an ink unit containing ink and comprising ink memory capable of storing various information, said ink memory storing ink-type information relating to a type of said ink contained in said ink unit, said ink-type information being stored in said ink memory before said ink unit is attached to said printing device body; and said printing device body to/from which said printing-medium unit and said ink unit are attachable/detachable, said printing device body reading-in said printing-medium-type information and said ink-type information, and determining suitability between said printing medium provided in said printing-medium unit and said ink contained in said ink unit.

* * * * *